Figure 1:
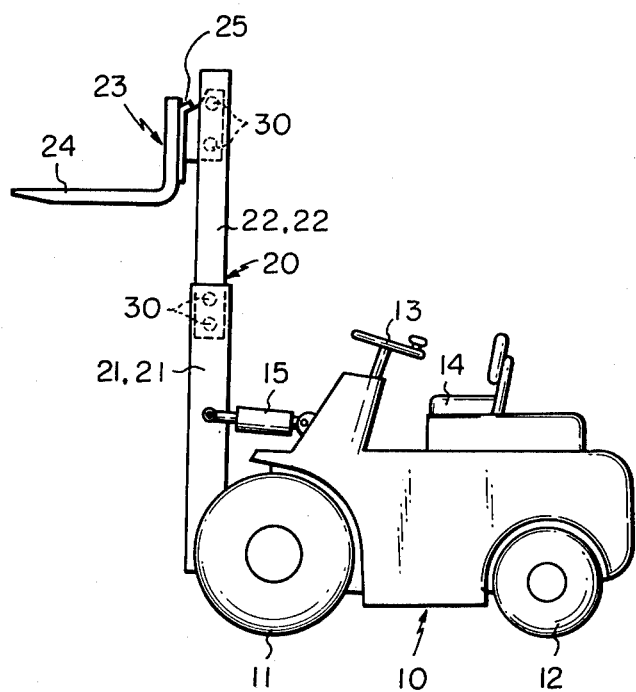

United States Patent [19]

Nakane et al.

[11] 4,234,057
[45] Nov. 18, 1980

[54] LIFT TRUCK HAVING A LOAD LIFTING ASSEMBLY

[75] Inventors: Masao Nakane, Handa; Masahiko Nishii, Okazaki, both of Japan

[73] Assignee: Kabushiki Kaisha Toyoda Jidoshokki Seisakusho, Kariya, Japan

[21] Appl. No.: 941,907

[22] Filed: Sep. 13, 1978

[30] Foreign Application Priority Data

Sep. 13, 1977 [JP] Japan .................... 52/123251[U]

[51] Int. Cl.³ ............................................... B66B 9/20
[52] U.S. Cl. ................................... 187/9 E; 308/6 R
[58] Field of Search ................. 187/9 E, 9 R, 95; 308/6 R, 3.8, 189 A; 414/611, 629, 631, 630

[56] References Cited

U.S. PATENT DOCUMENTS

| | | | |
|---|---|---|---|
| 3,148,005 | 9/1964 | Pusztay | 308/6 R |
| 3,414,086 | 12/1968 | Ulinski | 187/9 E |
| 3,556,247 | 1/1971 | Shinoda | 187/9 E |
| 3,741,346 | 6/1973 | Herdemann | 187/9 E |

Primary Examiner—Robert J. Spar
Assistant Examiner—Kenneth Noland
Attorney, Agent, or Firm—Burgess, Ryan and Wayne

[57] ABSTRACT

A lift truck having a wheeled truck body and a load lifting assembly which includes a pair of outer masts attached to the truck body, a corresponding pair of inner masts telescopically mounted in the pair of outer masts, a load lifter movably mounted on the pair of inner masts via a first and a second groups of lift rollers. The lift truck is characterized by comprising a resiliently biased contact pressure adjusting screw arrangement for adjusting contact pressures between the lift rollers and said inner mast.

9 Claims, 8 Drawing Figures

LIFT TRUCK HAVING A LOAD LIFTING ASSEMBLY

FIELD OF THE INVENTION

The present invention relates generally to a lift truck used for lifting a load and for carrying it from one position to some desired position, and more particularly to a load lifting assembly provided for such lift truck.

Conventionally, any type of lift truck is provided with a load lifting assembly mounted on the body of the lift truck. The conventional load lifting assembly has a pair of right and left outer masts, which are made of channel members and mounted on the front portion of the body of the lift truck, a pair of right and left inner masts, which are also made of channel members and mounted so as to be vertically movable with respect to the outer masts, and a load lifter mounted on the inner masts so as to be vertically moved with respect to the inner masts as well as the outer masts.

The load lifter is comprised of a fork member for mounting thereon a load and a lift bracket to which the fork member is attached. The lift bracket is provided with lift rollers which are rotatably mounted in the channels of the inner masts. The lift rollers made in the form of ball bearings or roller bearings have an inner race and an outer race, respectively. The outer races of the lift rollers engage at their outer peripheral surfaces the inner side surfaces of the channels of the inner masts so as to bear a force acting on the load lifting assembly in the front and rear direction of the body of the lift truck during the load lifting operation.

On the other hand, a force acting on the load lifting assembly in the direction transverse to the axis of the body of the lift truck during the load lifting operation is born by outer ends of the outer races of the lift rollers engaging the inner central surfaces of the channels of the inner masts. Further, since the inner masts are mounted in the channels of the outer masts so as to be vertically moved via lift rollers of the inner masts which are similar to the lift rollers of the load lifter, the lift rollers of the inner masts also serve to bear the above-mentioned forces acting on the load lifting assembly.

However, in the case of the conventional load lifting assembly of the lift truck, some particular shim or shims must be employed for adjusting contact pressures between the outer ends of the outer races of the lift rollers and the inner central surfaces of the channels of the inner masts or the outer masts when the load lifting assembly is assembled during the manufacturing process of the conventional lift truck. This adjustment of the contact pressures by employing the particular shims during assembly of the lift truck is cumbersome and time consuming.

Further it often occurs that re-adjustment of the contact pressures by employing the particular shims is needed during the usage of the lift truck, since the wearing of the ends of the outer races of the lift rollers or the wearing of the inner central surfaces of the channels of the inner masts or the outer masts occurs. This re-adjustment of the contact pressures is again cumbersome and time consuming.

Therefore, an object of the present invention is to obviate the above-mentioned drawbacks encountered with the conventional load lift assembly of the lift truck.

Another object of the present invention is to provide a load lifting assembly of a load truck having means for easily adjusting contact pressures between the outer ends of the outer races of the lift rollers and the inner central surfaces of the channels of the inner masts or outer masts of the load lifting assembly.

According to the present invention, there is provided a lift truck having a wheeled truck body, and a load lifting assembly mounted on the truck body, the load lifting assembly comprising:

a first and a second outer mast attached to the front end of the truck body, said first and second outer masts being respectively made of a channel member having therein a channel, a first and a second corresponding inner masts telescopically fitted in said first and second outer masts, respectively, said first and second corresponding masts being respectively made of a channel member having therein a channel, a load lifter including a fork member for mounting thereon a load to be lifted, and a lift bracket to which said fork member is attached, first and second groups of lift rollers provided for permitting said load lifter to move with respect to said first and second inner masts, said first group of lift rollers being arranged between said lift bracket and said first inner mast, said second group of lift rollers being arranged between said lift bracket and said second inner mast, each of said first group of lift rollers including an outer race member rotatably fitted in said channel of said first inner mast and having an outer flat surface contacting an inner central surface of said channel of said first inner mast for bearing a thrust force acting on said load lifting assembly during the lifting operation of said load lifting assembly, an inner race for mounting said each of said first group of lift rollers on a support pin rigidly connected to said lift bracket, and a number of balls arranged between said inner race and said outer race, said inner race being provided with a pressure transmitting member engaged therewith, each of said second group of lift rollers including an outer race member rotatably fitted in said channel of said second inner mast and having an outer flat surface contacting an inner central surface of said channel of said second inner mast for bearing a thrust force acting on said load lifting assembly during the lifting operation of said load lifting assembly, an inner race for mounting each of said second group of lift rollers on a support pin rigidly connected to said lift bracket, and a number of balls arranged between said inner race and said outer race, said inner race being provided with a pressure transmitting member engaged therewith; and first means for applying adjusting pressures to said pressure transmitting members of said first and second groups of lift rollers so that said pressures are transmitted to said outer races of said first and second groups of lift rollers whereby contacting pressures between said outer flat surfaces of said outer races of said first and second groups of lift rollers and said inner central surfaces of said channels of said first and second inner masts are appropriately adjusted.

The present invention will be apparent from the description set forth below, wherein reference is made to the accompanying drawings in which embodiments of the present invention are clearly shown.

Figure 2:
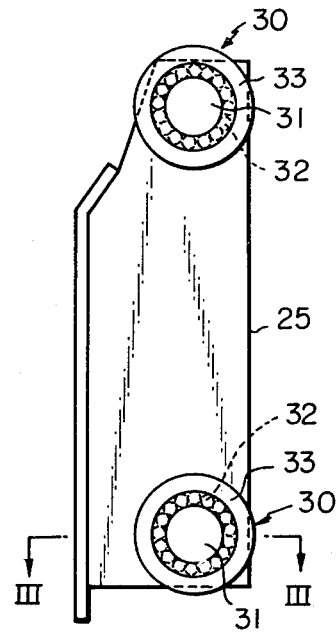
Figure 3:
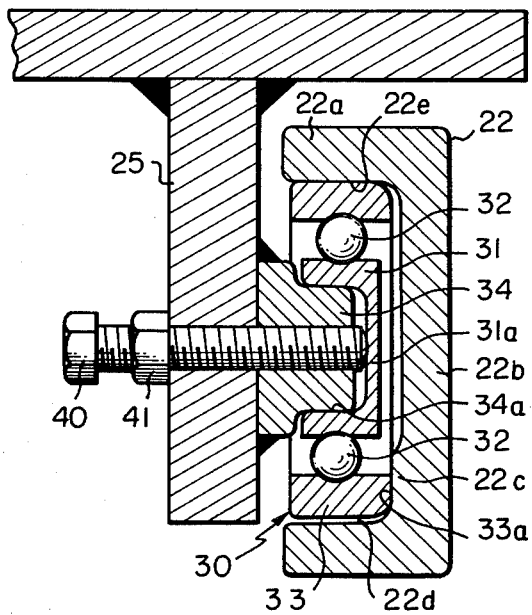
Figure 3A:
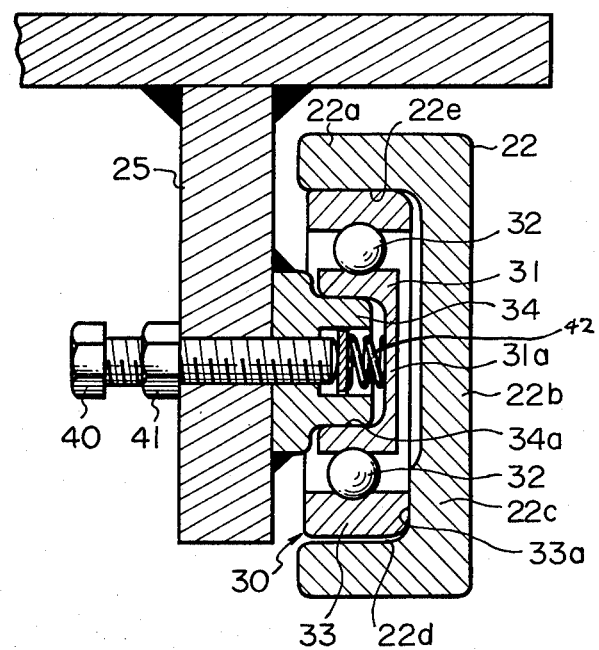
Figure 3B:
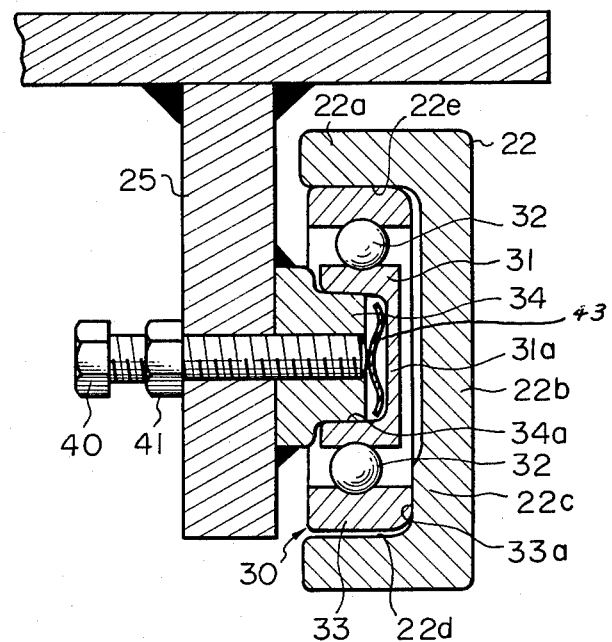
Figure 3C:
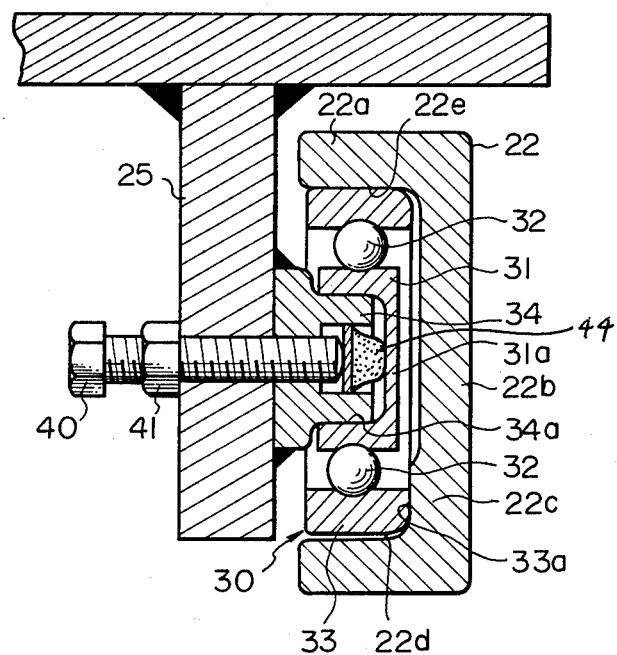
Figure 4:
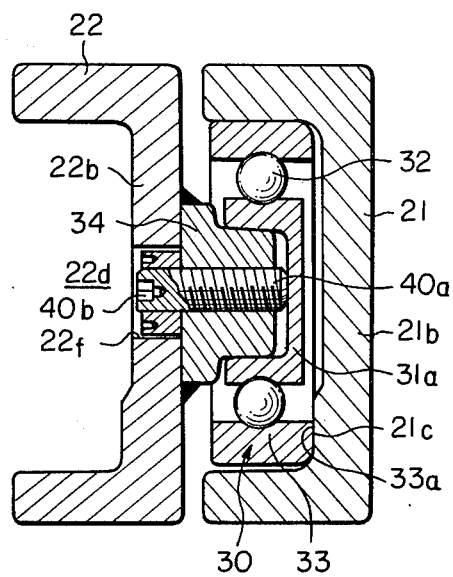
Figure 5:
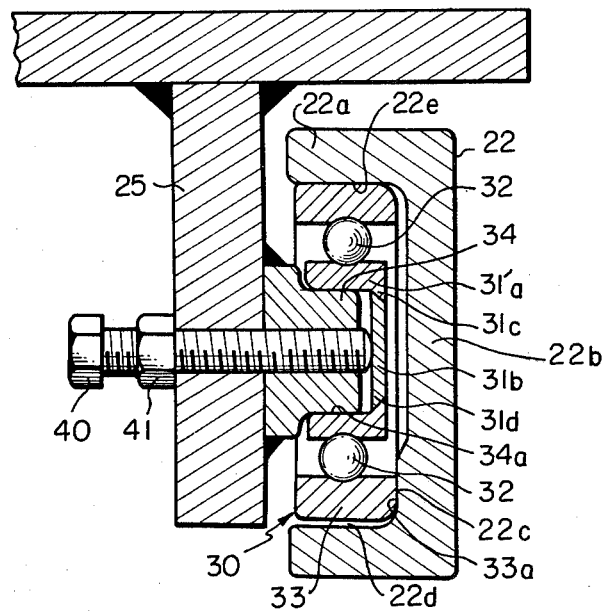

In the drawings:

FIG. 1 is a schematic side view of a lift truck provided with a load lifting assembly according to the present invention, FIG. 2 is a side view illustrating lift rollers mounted on the lift bracket of the load lifting assembly according to the present invention, FIG. 3 is a cross-sectional view illustrating an important portion of one embodiment of the load lifting assembly according to the present invention, FIG. 3A illustrates an alternative embodiment of the invention in which a spring coil and a metal plate are positioned between the screw and the cup-like inner race, FIG. 3B illustrates another arrangement in which a leaf spring is positioned between the screw and the cup-like inner race, FIG. 3C illustrates another arrangement in which a rubber member attached to a metal plate is positioned between the screw and the cup-like inner race, FIG. 4 is a cross-sectional view illustrating another important portion of the embodiment of FIG. 3, and FIG. 5 is a cross-sectional view illustrating a portion of importance to that of FIG. 3 of another embodiment of the load lifting assembly according to the present invention.

As is illustrated in FIG. 1, a lift truck has a truck body 10 mounting therein a drive mechanism including a pair of right and left front wheels 11, a pair of right and left rear wheels 12, and a steering wheel 13. The truck body 10 is also provided with a driver's seat 14. To the front end of the truck body 10, a load lifting assembly 20 is attached so as to be tiltable toward and away from the front end of the truck body by means of a cylinder 15. The load lifting assembly 20 includes a pair of right and left outer masts 21,21, a corresponding pair of right and left inner masts 22,22, a load lifter 23 having a fork member 24 on which a load to be lifted is placed, and a lift bracket 25. The inner masts 22,22 are telescopically fitted in the corresponding outer masts 21,21 by means of lift rollers 30. The load lifter 23 is attached to the inner masts 22,22 so as be slidable along the inner masts 22,22 by means of lift rollers 30. The telescopic movement of the inner masts 22,22 and the sliding movement of the load lifter 23 are produced by a common lift cylinder (not shown) and a sprocket and a chain mechanism (not shown) when the lifting operation of the load lifting assembly 20 is carried out.

FIG. 2 illustrates lift rollers 30 mounted on the lift bracket 25. As will be understood from FIG. 2, each of the lift rollers 30, in the form of a ball bearing, has an inner race 31, a number of steel balls 32, and an outer race 33.

Referring now to FIG. 3 which illustrates the typical construction of one of the lift rollers 30 and its related parts, the lift roller 30 is attached to a support pin 34 which is rigidly connected to an outermost surface of the lift bracket 25. The support pin 34 for the lift roller 30 has, at its outer end, a reduced diameter cylindrical portion 34a removably fitted into the inner race 31 of the lift roller 30 which is shaped as a cap-like member as illustrated in FIG. 3. The outer race 33 of the lift roller 30, having the shape of a ring member, is rotatable with respect to the inner race 31 by means of the rotatable balls 32. Furthermore, the outer race 33 of the lift roller 30 is fitted in the channel 22d of the inner mast 22, made of, for example, a metallic channel member, so as to enable the lift roller 30 to rotate and move along the inner surface 22e of one flange portion 22a of the inner mast 22.

Therefore, during the lifting operation of the load lifting assembly 20 (FIG. 1), the circumferential surface of the outer race 33 which contacts the inner surface 22e of the flange portion 22a bears or assumes a radial force acting on the load lifting assembly 20 (FIG. 1) in the front and rear direction of the truck body 10 (FIG. 1). The outer race 33 is rounded at its outermost corner confronting the innermost corner of the channel 22d of the inner mast 22.

Furthermore, the outer race 33 is formed with an outermost flat surface 33a serving as a bearing portion of a thrust force acting on the load lifting assembly 20 (FIG. 1) in the direction transverse to the above-mentioned front and rear direction of the truck body 10. It should be noted that the flat surface 33a serving as the thrust force bearing portion is needed to appropriately contact a pressure receiving portion 22c, formed in one portion of the central web 22b of the inner mast 22 adjacent to the inner corner of the inner mast 22 opposite to the inner corner formed by the flange portion 22a and the web 22b.

The above-mentioned portion formed with the pressure receiving portion 22c is thicker than the other portion of the central web 22b of the inner mast 22, as illustrated in FIG. 3. A screw member 40 is screwed in the lift bracket 25 and the center of the support pin 34. The screw member 40 has an outer end extending from the support pin 34 toward a flat bottom portion 31a of the inner race 31 of the lift roller 30. That is to say, when the screw member 40 is screwed into the lift bracket 25 and the support pin 34, the outer end of the screw member 40 applies an axial pressure to the inner race 31.

Therefore, the inner race 31 transmits the axial pressure to the outer race 33 via the balls 32 so that the flat surface 33a of the outer race 33 is pressed against the pressure receiving portion 22 of the inner mast 22. It should be understood that by adjusting the screwing movement of the screw member 40, the contact pressure acting between the flat surface 33a of the outer race 33 and the pressure receiving portion 22c of the inner mast 22 can be appropriately adjusted. A nut member 41 is used for locking the screw member 40.

It should now be appreciated that since the adjustment of the contact pressure between the outer race 33 of the lift roller 30 and the pressure receiving portion 22c of the inner mast 22 is easily attained by adjusting the screwing movement of the screw member 40 during the assembling of the load lifting assembly 20 (FIG. 1), it is possible to obtain an optimum state of the lift roller 30 wherein the outer race 33 of the lift roller 30 is able to smoothly rotate and move in the channel 22d of the inner mast 22 without causing any rattling motion of the lift roller 30.

This fact means that if the contact pressure between the outer race 33 of the lift roller 30 and the inner mast 22 is varied after long usage of the load lifting assembly 20 (FIG. 1) according to the present invention due to the wearing of the flat surface 33a of the outer race 33 or the pressure receiving portion 22c of the inner mast 22, it is possible to easily re-adjust the varied contact pressure by screwing the screw member 40 toward the flat bottom portion 31a of the inner race 31 of the lift roller 30. At this stage, it should be appreciated that the above-mentioned re-adjustment of the varied contact pressure is easily carried out without dismantling the load lifter 23 (FIG. 1) from the inner mast 32.

FIG. 4 illustrates the case where the lift roller 30 is adopted for telescopically connecting the inner mast 22 and the outer mast 21, although adoption of the lift roller 30 for accomplishing the telescopic connection between the inner mast 22 and the outer mast 21 is not indispensable. In the arrangement of FIG. 4, the lift roller 30 is attached to the support pin 34 rigidly connected to an outer surface of the inner mast 22. In the arrangement of FIG. 4, however, a screw member 40a used for adjusting the contact pressure between the flat surface 33a of the outer race 33 of the lift roller 30 and a pressure receiving portion 21c of the outer mast 21 has a screw head thereof which is situated in a bore 22f formed in the inner mast 22. That is to say, the screw head of the screw member 40 is not inwardly projected from the central web 22b of the inner mast 22. Therefore, no interference occurs between the lift roller 30 moving along the channel 22d of the inner mast 22 and the head of the screw member 40a during the lifting operation of the load lifting assembly 20 (FIG. 1) of the present invention. Naturally, the screw member 40 as illustrated in FIG. 3 may be modified so that the screw head of the screw member 40 is appropriately situated in a similar bore formed in the lift bracket 25. In connection with the screw member 40a of FIG. 4, it should be understood that the screw head of the screw member 40a is formed with, for example, a hexagonal bore 40b by means of which an adjusting screwing movement can be applied to the screw member 40a.

FIG. 5 illustrates the construction of the lift roller 30 modified from that of the lift roller 30 as illustrated in FIG. 3 or FIG. 4. In the construction of the lift roller 30 of FIG. 5, a substantially annular inner race member 31a and a separate round plate member 31b are used. In this case, the inner race member 31'a is formed with an inwardly inclined portion 31c against which a corresponding inclined outer circumference 31d of the round plate member 31b bears. It should be appreciated that the inner race member 31'a and the round plate member 31b cooperate with the screw member 40, so that the contact pressure between the flat surface 33a of the outer race 33 and the pressure receiving portion 22c of the inner mast 22 can be appropriately adjusted, and so that the smooth movement of the lift roller 30 along the channel of the inner mast 22 without causing any mechanical rattling motion of the roller 30 is achieved.

Naturally, the construction of the lift roller 30 as shown in FIG. 5 can be adopted for the connection between the inner mast 22 and the outer mast 21. Further, the inclined portion 31c of the inner race member 31a may be modified in its shape, so long as said portion 31c is capable of acting as a shoulder with which any round plate member, such as the member 31b, can be engaged. Further, in the foregoing embodiments, some resilient member, such as a coil spring 42 (FIG. 3A), a plate-like spring 43 (FIG. 3B) or a rubber member 44 (FIG. 3C) may be interposed between the screw member 40 or 40a and the inner race 31 or the plate member 31b so that the screw member 40 or 40a applies a force to the inner race 31 or the plate member 31b via such resilient member.

Thus, the force applied to the inner race 31 or the plate member 31b will be equally distributed into the entire area of the inner race 31 or the plate member 31b.

From the foregoing description of the embodiments of the present invention, it will be understood that the load lifting assembly of a lift truck according to the present invention can be very simple in its construction and that the manufacturing cost of the load lifting assembly can be reduced compared with the conventional load lifting assembly of a lift truck.

What is claimed is:

1. A lift truck having a wheeled body and a load lifting assembly mounted on the truck body, the load lifting assembly comprising:

a pair of laterally spaced-apart outer masts, each being made of a channel member having therein a channel and each being attached to the front end of the truck body;

a corresponding pair of inner masts, each being made of a channel member having therein a channel and each being telescopically fitted in the corresponding one of said pair of outer masts;

a load lifter arranged inwardly with respect to said pair of inner masts, and including a fork member for mounting thereon a load to be lifted and a lift bracket to which said fork member is attached;

a group of lift rollers arranged between said lift bracket and said pair of inner masts to permit said load lifter to move with respect to said pair of inner masts, each of said group of lift rollers comprising an annular outer race member rotatably fitted in the channel of a corresponding one of said inner masts and having an outer flat surface contacting an inner central surface of said channel of said corresponding one of said inner masts for bearing a thrust force acting on said load lifting assembly during the lifting operation of said load lifting assembly, a cup-like inner race member for mounting each of said group of lift rollers on a support pin rigidly connected to said lift bracket, and a number of balls arranged between said inner race member and said outer race member, said inner race member comprising an annular race portion coaxial with said annular outer race member and an outer round bottom portion arranged on an outer end of said annular race portion; and first screw means mounted on said bracket of said load lifting assembly for adjustably and outwardly axially pressing said outer round bottom portion of each of said group of lift rollers, so that said inner race member together with said outer race member of each of said group of lift rollers are adjustably and outwardly urged until said outer flat surface of said outer race each of said group of lift rollers contacts said inner central surface of said channel of said corresponding one of said pair of inner masts under an appropriate contact pressure.

2. A lift truck according to claim 1, wherein said annular race portion and said outer round portion of said inner race member of each of said group of lift rollers are integral with one another.

3. A lift truck according to claim 1, wherein said annular race portion and said outer round portion of said inner race member of each of said group of lift rollers are separate elements assembled together for forming said cup-like inner race member.

4. A lift truck according to claim 1, further comprising:

a different group of lift rollers arranged between said pair of inner masts and said pair of outer masts for permitting said pair of inner masts to telescopically move with respect to said pair of outer masts, each of said different group of lift rollers comprising an annular outer race member rotatably fitted in said channel of corresponding one of said pair of outer masts and having an outer flat surface contacting an inner central surface of said channel of said corresponding one of said pair of outer masts for bearing a thrust force acting on said load lifting assembly during the lifting operation of said load lifting assembly, a cup-like inner race member for mounting said each of said group of lift rollers on a support pin rigidly connected to the corresponding one of said pair of inner masts, and a number of balls arranged between said inner race member and said outer race member, said inner race member comprising an annular race portion coaxial with said annular outer race member and an outer round bottom portion arranged on an outer end of said annular race portion, and;

second screw means mounted on said pair of inner masts for adjustably and outwardly axially pressing said outer round bottom portion of said each of said different group of lift rollers so that said inner race member together with said outer race member of said each of said different group of lift rollers are adjustably and outwardly urged until said outer flat surface of said outer race of said each of different group of lift rollers contacts said inner central surface of said channel of said corresponding one of said pair of outer masts under an appropriate contact pressure.

5. A lift truck according to claim 4, wherein said first screw means comprise male screw members screwed in said lift bracket and said support pins, each of said male screw members being provided for the corresponding each of said group of said lift rollers and extending toward a substantially central portion of said round bottom portion of said corresponding each of said group of said lift rollers, and wherein said second screw means comprise male screw members screwed in said pair of inner masts and said support pins, each of said male screw members being provided for the corresponding each of said different group of said lift rollers and extending toward a substantially central portion of said round bottom portion of said corresponding each of said different group of said lift rollers.

6. A lift truck according to claim 5, wherein each of said male screw members of said first and second screw means has a screw head by means of which an adjustable screw motion is manually applied to said each of said male screw members.

7. A lift truck according to claim 4, wherein said annular race portion and said outer round portion of said inner race member of said each of said different group of lift rollers are integral with one another.

8. A lift truck according to claim 4, wherein said annular race portion and said outer round portion of said inner race member of said each of said different group of lift rollers are separate members assembled together for forming said cup-like inner race member.

9. A lift truck according to claim 4, further comprising resilient means interposed between said first and second screw means and said outer round bottom portions of said inner race members of said two groups of lift rollers.

* * * * *